Dec. 24, 1946.          E. M. SHOOK ET AL          2,413,116
SYSTEM FOR GEOPHYSICAL EXPLORATION
Filed Feb. 14, 1944          4 Sheets-Sheet 1

INVENTORS.
Earley M. Shook and
Robert W. Olson.
BY Sidney A. Johnson
Attorney.

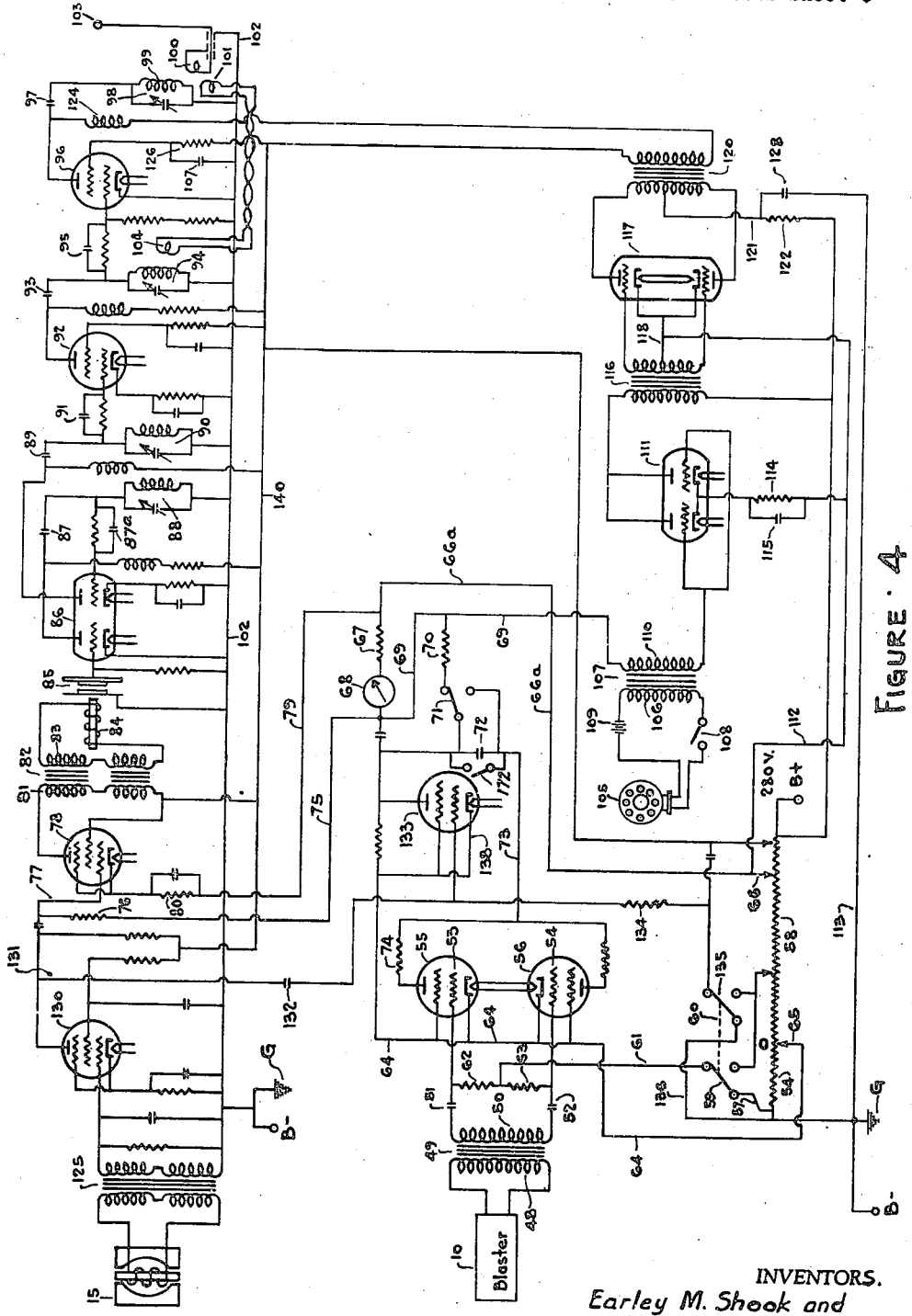

Dec. 24, 1946. E. M. SHOOK ET AL 2,413,116
SYSTEM FOR GEOPHYSICAL EXPLORATION
Filed Feb. 14, 1944 4 Sheets-Sheet 4

INVENTORS.
Earley M. Shook and
Robert W. Olson.
By Sidney A. Johnson
Attorney.

Patented Dec. 24, 1946

2,413,116

UNITED STATES PATENT OFFICE 2,413,116

SYSTEM FOR GEOPHYSICAL EXPLORATION

Earley M. Shook and Robert W. Olson, Washington, D. C., assignors, by mesne assignments, to Socony-Vacuum Oil Company, Incorporated, New York, N. Y., a corporation of New York Application February 14, 1944, Serial No. 522,358

5 Claims. (Cl. 177—352)

This invention relates to geophysical exploration, more particularly to reflection methods of seismic surveying in which the time break, the uphole geophone, and communication signals are to be transmitted from the shotpoint to a recording truck.

The seismograph method of exploration enables geologists and geophysicists to determine the location and depths of geological structures favorable to the accumulation of petroleum and other subsurface deposits. In brief, at a suitable location in the area to be explored or surveyed, a shothole of a few inches in diameter is drilled into the ground to a suitable depth, of the order of from 50 to 100 feet. In the shothole is inserted a suitable charge of a high-explosive such as dynamite. This hole is generally filled with water in amount adequate for tamping. The dynamite is exploded by a detonating cap connected to an electrical blaster, preferably of the type shown in Minton Patent No. 2,189,741. The explosion creates seismic waves which travel through the earth in all directions from the shotpoint. By means of a geophone placed at the top of the shothole, the time required for the vertical travelling waves to reach the earth's surface may be ascertained.

At a suitable distance from the shothole, from one to five thousand feet for reflection shooting, and up to 5 or 10 miles for refraction shooting, geophones or detectors are distributed along a line or over a selected area. These geophones known as the spread geophones may be from 5 to 50 in number. They are connected through amplifiers to a multi-element recording galvanometer to produce a photographic record of the arrival of the seismic waves. They not only record the waves which travel directly from the shothole to the spread geophones but they also record reflections of the seismic waves, which reflections occur between each interface of strata having materially different physical characteristics.

From the foregoing, it will be seen that not only must the photographic record, the seismogram, faithfully record the detected signals, but also that the time of arrival of the differing waves at the respective geophones is of paramount importance.

In areas to be surveyed, field operations may be exceedingly difficult. Between the shotpoint and the recording truck, there may be heavy undergrowth, swampland or flooded areas. These greatly increase the cost of, if not preventing entirely, the stringing of the necessary telephone wires for the transmission of the time break, the uphole geophone, and communication signals from the shotpoint to the recording truck. The transmission by radio of these signals has been proposed, but spurious signals superimposed upon the carrier have made difficult the transmission and recordation of the desired signals with sufficient clarity so as to be easily recognized on the seismogram. Systems such as shown in Shook et al. Patent No. 2,290,773 have been utilized, but leave much to be desired in the faithful transmission and recordation of all or a selected portion of the signals from the uphole geophone.

In carrying out the present invention in one form thereof, a frequency modulated carrier wave is utilized for the transmission of signals representative of the time break and the uphole break and the same carrier is amplitude modulated for the transmission of communication or voice signals. The combined AM-FM system which forms the subject matter of the present invention functions faithfully to transmit an electrical impulse representative of the instant of creation of the seismic waves; it functions with extremely high fidelity to transmit the exact character of the first seismic wave received and detected by the uphole geophone; and it functions to permit the simultaneous transmission of voice signals. A minimum of equipment and power is utilized. The system further includes means automatically operable after transmission of the desired uphole geophone signal to disable the transmitting system as a whole in order that the same galvanometer at the recording truck may be used for one of the spread geophones. In this manner a single galvanometer records on a single trace of a seismogram the time break impulse, the uphole break, and the signals received by one of the geophones of the spread.

This invention further resides in features of construction, combination and arrangement described hereinafter.

For a more detailed understanding of the invention, reference should now be had to the accompanying drawings, in which:

Fig. 4 is a schematic wiring diagram of a transmitting system embodying the invention;

Figure 1:
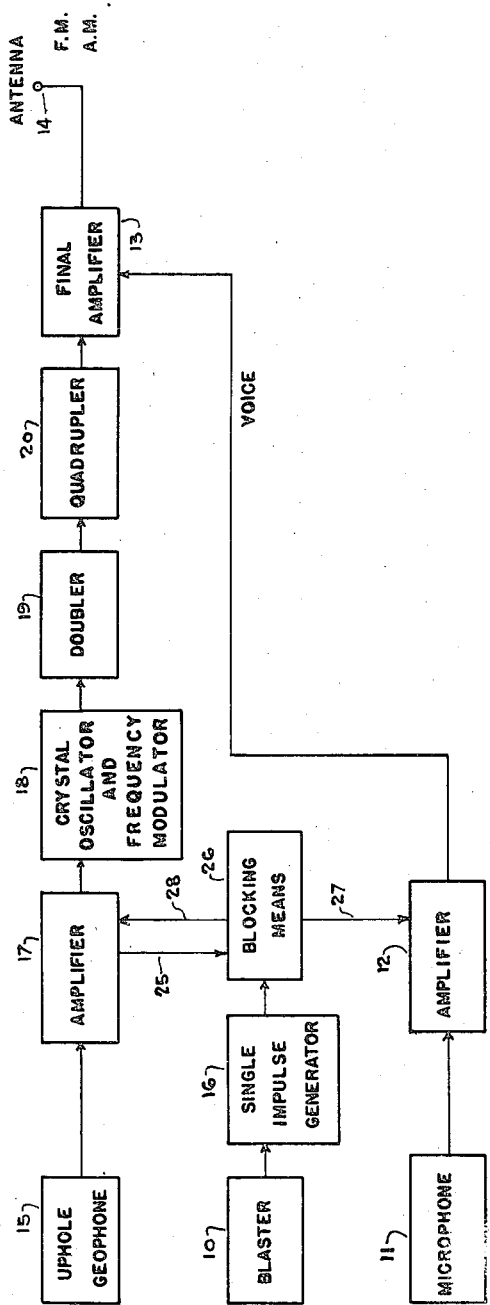
Fig. 1 is a block diagram of the transmitting system.

Referring to the form of the invention illustrated in Fig. 1, a blaster 10 includes a detonating system preferably of the type shown in Minton patent No. 2,189,741. During preparation or installation of the explosive charge in the shothole, and during the location of the spread of geophones, the crew at the shotpoint maintains communication with the crew at the recorder by means of a microphone 11 which through an amplifier 12 produces amplitude modulation at the final amplifier 13 of the transmitting system. The amplitude modulated carrier is radiated from an antenna 14. A radio transmitter of any suitable type for transmitting voices at the recording truck and a radio receiver at the shotpoint (neither shown) may be utilized to complete two-way communication between the field parties. When all is in readiness at both locations, with the uphole geophone 15 located on the earth's surface adjacent the shothole, word is received from the recording truck to detonate the charge of dynamite located in the shothole. This is done by operation of the blaster 10. Coincidentally with the explosion of dynamite, a single time break impulse is produced by generator 16. This single electrical impulse is amplified by amplifier 17 and by means of the crystal oscillator and frequency modulator as indicated at 18, a frequency modulated impulse is produced. The frequency modulated impulse passes through a frequency doubler 19, and frequency quadrupler 20, the final amplifier 13, and to the antenna 14. The frequency modulated carrier is demodulated by a suitable receiver at the recording truck and the single time break impulse is faithfully recorded on the seismogram by a suitable galvanometer appropriately connected to the receiver. This time break impulse is indicated at 22, Fig. 3. As above explained, it is known as the time break and it is recorded on a trace of the seismogram coincidentally with the instant of generation of the seismic waves, which are produced by the explosion of the dynamite.

It will be understood by those skilled in the art that a seismogram is produced by suitable means such as a multiple-element recording galvanometer. Each galvanometer produces a single trace which may correspond with the seismic waves received by a detector or geophone. The trace of Fig. 3 also records the time break 22 as already described. Across each trace are vertical timing lines. The horizontal distance between adjacent lines is generally predetermined and selected to equal one-hundredth of a second.

Since the uphole geophone may be but from 50 to 100 feet from the seismic wave generating means, the time required for the waves to reach the uphole geophone is exceedingly short. It usually is of the order of from five thousandths to two hundredths of a second. This means, of course, that the impulse generator 16 must not only operate to produce the single time break impulse but within that exceedingly short time it must be rendered inoperative for the production of other or additional impulses; otherwise, the signals from the uphole geophone would be obscured and indeterminable on the seismogram. The instant of first arrival of the vertical traveling seismic waves at the uphole geophone 15 is detected and the resultant electrical signal applied to the amplifier 17, the output from which is utilized to produce at 18 frequency modulation of a radio carrier wave which, after passing through the doubler 19, the quadrupler 20, the final amplifier 13, is radiated from the antenna 14. As before, the FM carrier is demodulated at the receiver and the uphole geophone signals are recorded, as shown at 23, Fig. 3, on the single trace 21 of the seismogram. The instant of first arrival of the uphole signals is accurately determined and the true character of the uphole break is faithfully recorded.

The first of the uphole signals, derived from the amplifier 17 by way of line 25, initiates operation of a blocking means 26 for the application of a negative bias, by way of lines 27 and 28, to the amplifiers 12 and 17, which bias renders each amplifier inoperative or blocks the further transmission of signals therethrough. This blocking means 26 eliminates all further signals from the recording galvanometer and makes it possible for the trace 21 to be utilized for the recordation of signals 28 from a selected geophone of the spread. Alternatively the blocking means may be operated a time interval after production of the time break impulse.

Figure 2:
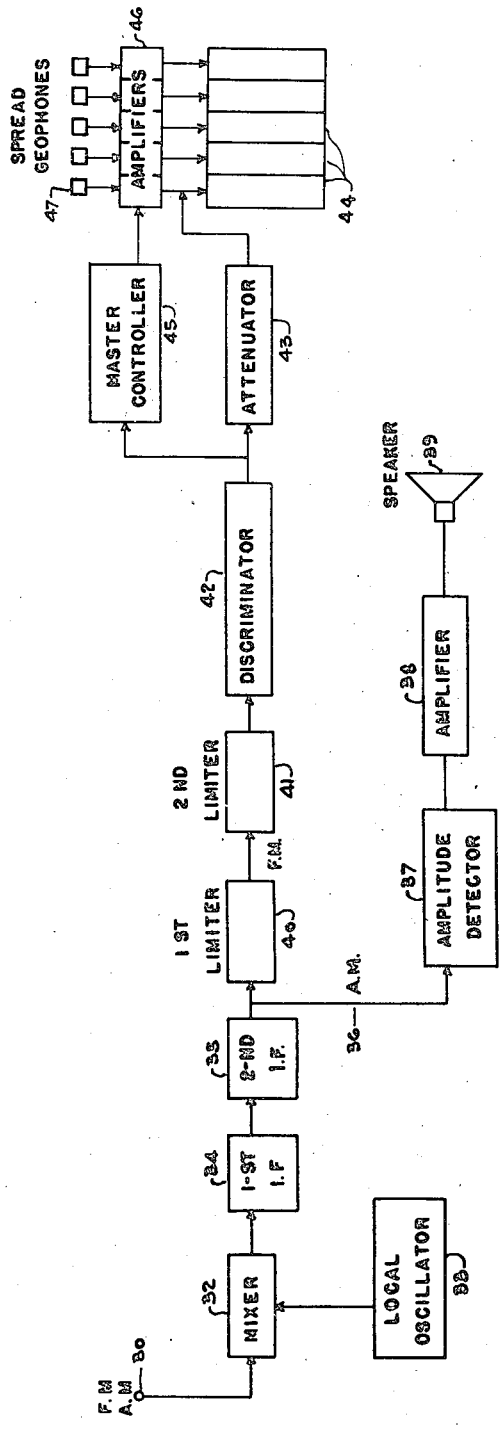
Fig. 2 is a block diagram of a preferred receiving system.

The preferred form of the receiving system is diagrammatically illustrated by the block diagram of Fig. 2. The carrier, frequency and amplitude modulated, is received by an antenna 30 and is applied to a conventional mixer 32 which also receives a locally generated signal from a local oscillator 33. In accordance with conventional superheterodyne principles, the result is an amplitude and frequency modulated signal at an intermediate frequency, which is then amplified in two intermediate frequency stages 34 and 35. The amplified output from the second IF stage 35 is applied by line 36 to a demodulator or detector 37 of amplitude modulated signals and the audio output therefrom passes through an amplifier 38 and to a loud speaker 39. The amplified output from the second IF stage 35 is also applied to limiter 40. The two limiters 40 and 41 function to provide an output signal for a discriminator 42 of uniform amplitude and in avoidance of interference by the amplitude modulated carrier. The frequency modulated signals are detected or demodulated by the discriminator 42 and pass by way of an attenuator 43 to one of several recording galvanometers 44 which produces the seismogram illustrated in Fig. 3. The output signal from the discriminator 42 may also be utilized to initiate operation of a master controller 45 which, in cooperation with one or more amplifiers 46, controls the gain in the signals from a plurality of geophones 47 comprising the geophones of the spread. The master controller 45 may be of a type like or similar to those described in United States Letters Patent No. 2,301,739, 2,306,991, or 2,312,934.

With the foregoing understanding of the broad principles underlying our invention, reference may now be had to the wiring diagram of Fig. 4 wherein the blaster 10, as above described, includes a circuit effective upon detonation of the charge of the dynamite to apply a voltage impulse to the primary winding 48 of a transformer 49. The secondary winding 50 is connected through coupling condensers 51 and 52 to the control grids 53 and 54 of a pair of gas tubes 55 and 56, each of which has the characteristic of continued flow of anode or plate current once the grid loses control. Tubes of this type are also known by the trade name of "Thyratron." Each of the control grids 53 and 54 has a negative bias derived from the negative end of a voltage divider 58 which bias is applied by way of the contact 59 of a double pole switch 60, conductor 61 and by resistor 62 to control grid 53 and by way of resistor 63 to control grid 54. The cathodes and suppressor grids of each of the gas tetrodes 55 and 56 are connected together and to conductor 64, which forms a common return circuit to a tap 65 located at a position marked at zero on the voltage divider 58. While gas tetrodes are illustrated, it will be understood gas triodes may be used if desired.

By reason of the circuit connections including resistors 62 and 63, the negative bias on one or the other of control grids 53 or 54 is materially reduced in value by the voltage impulse applied by the blaster 10, while the negative bias on the other grid is materially increased. The exact operation depends upon the polarity of the impulse as applied to the primary winding 48. Regardless of polarity, however, any impulse from the blaster 10 makes one or the other of grids 53 or 54 sufficiently less negative to cause a gas tube to fire or to render it conductive. Plate current immediately flows through a circuit which may be traced from a tap 66 on the voltage divider 58 by conductor 66a, resistor 67, meter 68, conductor 69, resistor 70, switch 71, condenser 72, conductor 73, (and assuming gas tetrode 55 is fired) resistor 74, the anode of tube 55 and from the cathode by way of conductor 64 to tap 65 on the voltage divider 58. Current continues to flow until the condenser 72 is charged. This occurs very rapidly and when condenser 72 is charged, the effect is to remove the voltage from the anodes of the tubes 55 and 56 and neither tube may fire upon reversal of or production of subsequent impulses from the blaster 10. This fact is important inasmuch as the blaster ordinarily includes wires which are ruptured by the explosion of the dynamite. In many cases the wires are not only blown apart but are also blown upwardly and possibly out of the shothole. During their travel they may repeatedly engage and disengage. In many cases there are a number of impulses following the one indicative of the instant of creation of the seismic waves. By providing the foregoing circuit arrangements for the two gas tubes, but a single impulse is generated—the one that coincides with the instant of creation of the seismic wave.

It will be observed one side of the series combination of meter 68 and resistor 67 is connected by conductor 75, resistor 76 and by conductor 77 to the control grid of a thermionic pentode amplifying tube 78, while the other side of the resistor 57 and meter 68 is connected by conductor 79 and resistance 80 to the cathode of tube 78. In consequence, the current impulse through the resistor 67 and meter 68 produces a potential difference or IR drop which is applied to the control grid of pentode 78. The result is the production in the output circuit including the primary winding 81 of transformer 82 of a voltage impulse of amplified magnitude. This is applied by secondary winding 83 to an operating coil 84 of a frequency modulating device 85, the details of which will be later set forth. The application of the amplified impulse to the device 85 produces a change in the frequency of the crystal oscillator which includes the first stage of a double triode thermionic tube 86, whose output circuit includes the coupling condenser 87 and the tank circuit 88. The output of the crystal oscillator stage is applied through grid leak condenser 87a to the control grid of the second section of the double triode 86. The second stage of the double triode tube 86 includes the coupling condenser 89 and a tank circuit 90 which functions as a frequency doubling stage. The output from the frequency doubler is applied through grid leak condenser 91 to the control grid of a tetrode tube 92, the output circuit of which includes a coupling condenser 93 and a tank circuit 94 which functions to quadruple the frequency. The output from tube 92 is applied through the grid leak condenser 95 to the control grid of a thermionic tube 96, the anode or output circuit of which includes a coupling condenser 97 and a tank circuit 98. The inductor 99 forming a part of the tank circuit 98 is inductively associated with the coils 100 and 101. The coil 100 has one end connected to the exterior of a concentric transmission line and its other end is connected to the inner conductor or wire thereof, which leads to the radiating antenna 103. The outside of the transmission line is also connected by conductor 102 to ground G.

The coil 101 comprises a single turn and forms a part of a link circuit between the final tank circuit 98 and the tank coil of the frequency quadrupler. This is accomplished by a second coil 104 comprising a single turn located in inductive relation with the coil or inductor of the tank circuit 94. Sufficient coupling of correct polarity is obtained to provide neutralization of the final stage.

By means of a microphone 105 voice currents may be produced in the primary winding 106 of a transformer 107 when a normally open switch 108 is moved to closed position. This circuit may also include battery 109, if desired. From the secondary 110 of transformer 107, voice signals are applied directly to the control grids of a double triode tube 111, the respective electrodes of which are connected in parallel with each other. The grid circuits may be traced through winding 110, the conductor 69, meter 68, resistor 67, conductors 66a and 112, and the resistor 114, which is connected to the two cathodes of tube 111. The grid biasing resistor 114 is provided with the usual bypass condenser 115. The output from tube 111 is applied through transformer 116 to the control grids of a double triode tube 117. In this case, the respective cathodes are connected by conductor 118 to a midtap of the secondary winding of transformer 116. The respective triodes of the tube 117 are connected in push-pull relation, the output circuit including the primary winding of a transformer 120, having a conductor 121 leading from a midtap thereof through a resistor 122 to the source of anode potential, including voltage divider 58. The secondary winding of the transformer 120 is in series with the source of anode potential for tube 96. Thus, one end of the secondary is connected through an RF choke coil 124 to the anode of the tube 96, while its other end is connected by conductor 140 to B plus on voltage divider 58, the return being by way of ground connection G and conductor 102 to the cathode of tube 96.

As previously pointed out, the transmitting system may frequently be operated in a region quite remote from good roads and usual power facilities. Hence the design requirements are somewhat severe as regards weight and power consumption. Ordinarily, storage batteries are utilized, with a vibrator, and suitable transformers, and filter circuits to provide the required potential for the supply of anode current. The tube 117 is preferably operated as a class B amplifier and a relatively large condenser 128 is connected so as to supply the peak demands of class B modulation.

Members of the crew at the shotpoint may utilize the microphone 105 to communicate with the men at the recording truck. At the time a seismogram is to be made, the blaster 10 is operated and a single impulse produced by flow of current through one of the gas triodes 54 or 55 is applied to the amplifier 78 and to device 85 and a frequency modulated signal is radiated from the antenna 103. Almost immediately, the uphole geophone 15 applies an electrical signal by way of transformer 125 to a pentode amplifying tube 130, the output of which is coupled in conventional manner to the amplifying tube 78, and in like manner frequency modulation in accordance with the uphole signal is produced by device 85 which is also radiated from antenna 103. It may here be observed the polarity of the geophone 15 is determined and the connections to amplifier tube 130 are such that the first seismic wave arriving at geophone 15 produces in the output circuit of tube 130 an electrical impulse of negative polarity. The first impulse of negative polarity from the geophone 15, as it appears in the output circuit of the amplifying tube 130, is also applied by way of conductor 131 through a condenser 132 to the control grid of a gas tube 133.

This gas tube 133 is negatively biased to a non-conducting condition through a circuit which includes the resistor 134, contact 135 of switch 60, and by conductor 136 to the negative end (minus five volts) of the voltage divider 58. The return circuit is by way of tap 65, conductors 64 and 138, and to the cathode of gas tube 133. Because the first impulse or half cycle of the uphole geophone signal is of negative polarity as it appears in the output circuit of tube 130, the application of that half cycle to the control grid of gas tube 130 renders it more negative. Hence it does not fire and does not interfere with the transmission of said half cycle to the recorder where the true character thereof is recorded on the seismogram.

However, upon the appearance of the subsequent half cycle of opposite or positive polarity, the application thereof through the circuit including condenser 132 reduces the negative bias on the control grid of gas tube 133. Hence this tube immediately fires or becomes conductive and current flows through a circuit which may be traced from its cathode by way of conductors 138 and 64, taps 65 and 66 of voltage divider 58, conductor 66a, resistor 67, meter 68, conductor 69, resistor 70, switch 71, and to the anode of tube 133. Because of the characteristic of gas tube 133 current continues to flow in this circuit and the voltage drop across the resistor 67 and meter 68, which is included in the grid circuit of tube 78, is immediately effective to bias the tube 78 to an inoperative condition through a circuit which includes conductor 75, resistor 76, conductor 77, resistor 80, and conductor 79. At the same time the voltage drop across resistor 67 and meter 68 negatively biases the amplifying tube 111 to an inoperative or non-conductive condition, through a circuit including conductor 69, and through the secondary winding 110 to the grids, the return circuit being from the cathodes, resistor 114, and by way of conductors 112 and 66a to the other side of resistor 67.

Since the resistor 67 and the meter 68 are both included in the grid circuits of tubes 78 and 111, the foregoing current flow is effective to block both tubes. In this connection, it will be remembered the resistor 67 was also utilized in conjunction with the capacitor 72 to produce the single impulse representative of the time break. This impulse resulted from the momentary flow of current through the resistor 67, a flow which persisted only long enough for the capacitor 72 to be charged.

Figure 3:
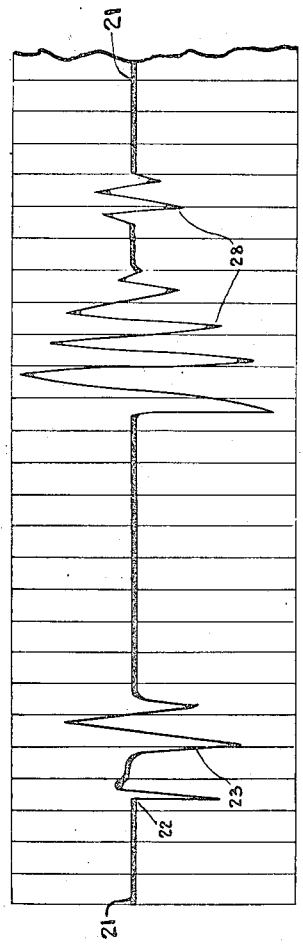
Fig. 3 illustrates the desired data as recorded on a single trace of a seismogram.

As shown in Fig. 3, this time break impulse, which begins at 22, is of extremely short duration. For that reason, though this impulse is also applied to the grids of tube 111, it does not interfere with operation of the microphone 105 even though the impulse may be heard at the receiving station.

It will further be observed that the tap 66 of the voltage divider 58 is utilized as the source of anode supply for the gas tubes 56, 55 and 133, while this same tap 66 is connected by conductor 112 and resistor 114 to the cathode of the tube 111. The tap 66 is connected by conductors 66a, 79, and resistor 80 to the cathode of the tube 78. The anode supply for tubes 78 and 111 is derived from a higher-voltage tap, the one nearer B+. In consequence, the tubes 78 and 111 operate with their cathodes well above ground potential, in fact, at a voltage substantially equal to that of tap 66. By arranging the circuits in this manner, and as further pointed out herein, the single source of potential indicated by B— and B+ adequately serves to supply the various tubes and thus avoids the need for the presence of separate sources of supply.

It will therefore be seen that the tube 133 provides a means for blocking translation of further signals through both of tubes 78 and 111, the net result of which is the elimination of radiation from the antenna 103 of modulated signals of any character. All subsequent disturbances of the uphole geophone and microphone cannot produce modulation of the carrier. In consequence, at the receiving station, there is accurately recorded by one of the galvanometers 44, Fig. 2, on the trace of the seismogram a time break impulse 22, Fig. 3, indicative of the instant of creation of the seismic waves. On the same trace of the seismogram there are recorded the uphole geophone signals 23 representative of the uphole break. By operation of the tube 133, all further signals from the shotpoint are blocked, but a geophone 47 of the spread such as shown in Fig. 2 is connected to the same galvanometer and on the same trace there may be recorded seismic signals 28 detected by the geophone 47. As further shown in Fig. 3, after the uphole break 23 has been recorded, the signals generated by the geophone 47 as indicated at 28 are recorded. The accuracy and the high fidelity with which the time break and uphole signals are recorded is accomplished in the presence of spurious noise or signals such as are produced by static, commutator ripple, or other extraneous sources of electrical energy which have heretofore played havoc with radio transmitting systems utilizing amplitude modulation of a carrier for the transmission of seismic signals.

It will be recalled that the time break or shot instant was determined or represented by a single electrical impulse produced by the flow of a surge of current through one of the gas tubes 55 and 56 while charging the condenser 72. Further impulses from the blaster 10 were blocked or prevented from affecting the tubes 55 and 56 by operation of the condenser 72 to remove the voltage from the anodes thereof. Further impulses from the uphole geophone and microphone are blocked by a constant bias resulting from the IR drop across resistor 67 and meter 68 when tube 133 is conducting.

It is seen that during the process of making a seismogram, the transmission of time break, uphole and voice signals was interrupted. The circuit arrangement as shown provides complete restoration of the circuit to its original condition by the operator at the shotpoint when he is compelled to reset the circuit to reestablish communication.

To restore the circuit to its original condition and in readiness for the next field operations, the switch 71, normally spring biased to its illustrated position, is momentarily depressed. This opens the anode circuit of tube 133 and completes a discharge circuit for the condenser 72. Upon return of the switch 71 to its original position the negative bias on the grid of gas tube 133 prevents further current flow until the application to its grid of the next positive impulse; and the condenser 72 having lost its charge is in readiness to assist in producing one impulse representative of the shot instant or time break and for blocking all subsequent impulses which may appear in the blaster 10 and which may be applied to the control grids of tubes 55 and 56.

For testing purposes, the spring biased switch 60 may be momentarily operated from its illustrated position. The contacts 59 and 135 serve not only to remove the negative bias on tubes 55, 56 and 133 but also to apply a positive bias thereto.

Circuit elements not described in detail represent conventional practice. For example, the plate or anode circuits of tubes 86, 92 and 96 are shunt fed with RF choke coils included in each circuit. The anode voltage for tube 130 is obtained from B plus by way of conductor 140 and conventional resistors. The cathode of tube 130 is connected directly to B minus and to ground. The tube 78 has its anode connected through primary winding 81 to conductor 140 and to B plus while its cathode is connected through resistor 80 and conductors 79 and 66a to tap 66. Similarly tubes 111 and 117 have their cathodes connected to tap 66 with their anodes connected to B plus. In this manner the single voltage divider 58 and the one source of potential indicated by B minus and B plus serve the various tubes in manner already described in detail.

The antenna 103 may be of the "whip" type; that is, it may comprise telescopic tubes which may be elevated to the desired height to provide proper tuning for the selected resting frequency.

When the uphole geophone is not to be used, the normally open switch 172 in shunt with the capacitor 72 is closed. Hence, the current flowing to the gas tube 55 or 56 which fires continues to flow through resistor 67 and the meter. The tubes 78 and 111 are blocked in manner already described to prevent further transmission of voice signals or any further signals from antenna 103.

Figure 5:
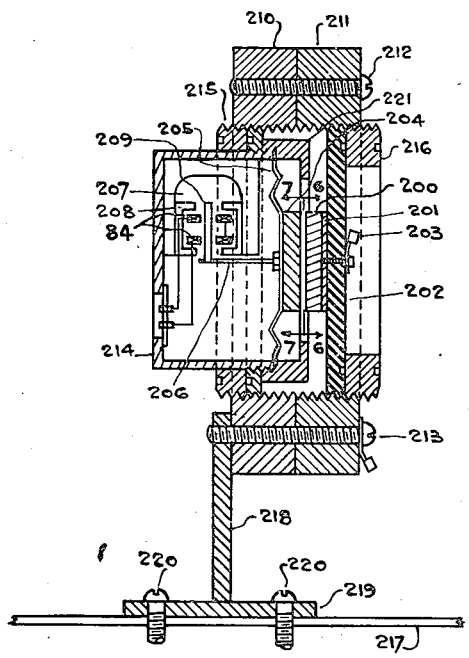
Fig. 5 is a sectional elevation of a frequency modulating device.
Figure 6:
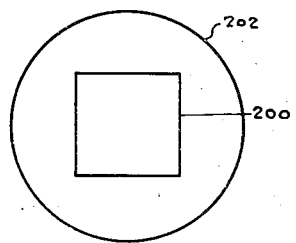
Figs. 6 and 7 are views looking toward the crystal and actuating unit, respectively.
Figure 7:
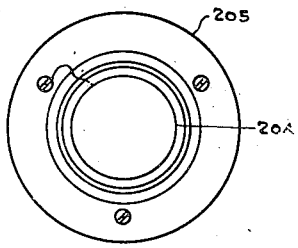

The device 85 has been described as producing the frequency modulation of the carrier radiated from antenna 103. It also serves to determine the resting frequency, or the frequency of the carrier in the absence of frequency modulation. It may take various forms, but the one preferred, the device 85, comprises, Fig. 5, a crystal 200 mounted on a metal back plate 201 which is itself carried on a support 202 of insulating material such as "Bakelite." An electrical connection 203 leads to the metal plate 201. The crystal 200 is rectangular in shape and is preferably cut so as to be stable in operation even with temperature variations. As shown in Fig. 6 both the crystal 200 and back plate 201 have the same rectangular shape.

A cooperating metallic plate 204 is carried by a metallic diaphragm 205 operatively connected by linkage 206 to an electromagnetic operating unit 207. This unit is provided with operating coils 84, cooperating magnetic structure 208 and an armature 209. The diaphragm 205 is preferably provided with several corrugations to minimize resistance to movement by the armature 209 and linkage 206. The corrugations also insure return of the diaphragm to its original position after movement therefrom in either direction.

To provide easy adjustment and rigid securement of all parts in desired final positions, the outer frame, annular in shape, consists of interiorly threaded members 210 and 211 locked together by a series of screws, two of which, the screws 212 and 213 are shown. The housing 214 threadedly engages frame member 210 and is locked in position by threaded ring 215. The insulated support 202 threadedly engaging frame member 211 is held in position by a locking ring 216. The frame 210—211 is mounted from a part of a chassis or stationary member 217 by means of an upright support 218 and a base plate 219 which by means of screws 220 is secured to member 217.

The diaphragm 205 is clamped by a locking ring 221 against the inner edge of the housing 214.

As shown in Fig. 4, the device 85 which includes crystal 200 and plate 201 is connected in the grid circuit of the tube 86. In manner understood by those skilled in the art, the crystal 200 is connected to the first section of tube 86 which makes up a conventional crystal controlled oscillator.

Upon application of signals to the operating coil 84 the armature 209 through linkage 206 moves the diaphragm-carried metallic plate 204 toward and away from the face of crystal 200. The resultant changes in the air gap between plate 204 and crystal 200 produce a change in the frequency proportional to the change in the air gap and in amount adequate for transmission and reproduction with high fidelity of the time break and uphole geophone signals. The frequency multipliers, second section tube 86 and tube 92, Fig. 4, also multiply frequency changes produced by device 85.

It will now be realized that a signal electrical impulse representing the time break or the instant of creation of the seismic waves produces frequency modulation and at the recorder produces a photographic record coincidentally with the instant of their generation. Almost instantaneously thereafter, within as little as about one hundredth of a second an electrical signal is produced in response to arrival at the earth's surface of seismic waves from the shotpoint. This signal likewise produces frequency modulation of the carrier and the true character of the uphole geophone signal is faithfully recorded on the same trace of the seismogram as the uphole break. Thereafter seismic waves and their reflections are detected by a geophone of the spread which is wire-connected to the recorder and these too are recorded on said trace of said seismogram.

Before and during the frequency modulation of said carrier, the voice modulating means is operable to produce amplitude modulation of the carrier but as soon as the uphole geophone signal has been transmitted, both the amplitude and frequency modulating means are rendered inoperative until the manually operable switch 71 has been operated.

In its broader aspect the invention embraces the system by which the time break and uphole signal produce frequency modulation of said carrier without interference between them. And the invention further embraces the features of concurrent amplitude modulation of the carrier without interference with the frequency modulated signals and the other features already described in detail.

While we have illustrated a preferred embodiment of our invention, it is to be understood we intend by the claims to cover all modifications which fall within the true spirit and scope of our invention.

What is claimed is:

1. In a system for geophysical exploration in which seismic waves are created and their travel time through the earth measured, the combination of a single radio transmitter for radiating a single carrier from a sending location; means for producing a single electrical impulse coincidentally with the instant of creation of said seismic waves, means including an amplifier and operable by said single impulse for frequency modulating said carrier substantially during the period of said impulse, means including an uphole geophone for producing an electrical signal indicative of the arrival at the earth's surface of seismic waves which have travelled through at least a part of the weathered layer of the earth's surface, means including said amplifier for applying said signal to said frequency modulating means to produce frequency modulation of said carrier during the period of said signal, a second amplifier, sound responsive means including said second amplifier and concurrently operable for producing amplitude modulation of said carrier, means including a seismic recorder at a receiving location for recording on a single trace said impulse said signal and seismic waves after travel through the earth, and means operable immediately after said geophone signal produces said frequency modulation for rendering said amplifiers inoperative thereby to prevent further frequency and amplitude modulation of said carrier thereby to prevent application to said recorder of further signals and impulses during the period of recording of the seismic waves which have travelled through the earth to said recorder.

2. In a system for geophysical exploration in which seismic waves are created below the earth's surface and their travel time through the earth measured, the combination of a single radio transmitter for radiating a carrier from a sending location, means for producing a single electrical impulse coincidentally with the instant of creation of said seismic waves, means including an amplifier operable by said single impulse for frequency modulating said carrier substantially during the period of said impulse, a second amplifier, sound responsive means including said second amplifier and concurrently operable for producing amplitude modulation of said carrier, means including a seismic recorder at a receiving location for recording on a single trace said impulse and said seismic waves after travel through the earth, demodulating means responsive to the frequency modulated carrier for actuating said recorder to record said impulse and said signal, said demodulating means including signal-limiting means for preventing operation of said recording means by amplitude modulation of said carrier, means operable immediately after said impulse produces said frequency modulation for so biasing said amplifiers as to prevent further frequency and amplitude modulation of said carrier during the period of recording of said seismic waves at said receiving location, and means for rendering said biasing means ineffective thereby to render effective said frequency and amplitude modulating means for subsequent modulation of said carrier.

3. In a system for geophysical exploration in which seismic waves are created below the earth's surface and their travel time through the earth measured, the combination of a single radio transmitter for radiating a carrier from a sending location, means for producing a single electrical impulse coincidentally with the instant of creation of said seismic waves, means including an amplifier operable by said single impulse for frequency modulating said carrier substantially during the period of said impulse, means including an uphole geophone for producing an electrical signal indicative of the arrival at the earth's surface of seismic waves which have travelled through at least a part of the weathered layer of the earth's surface, means including said amplifier for applying said signal to said frequency modulating means to produce frequency modulation of said carrier substantially during the period of said signal, a second amplifier, sound responsive means including said second amplifier and concurrently operable for producing amplitude modulation of said carrier, means including a seismic recorder at a receiving location for recording said impulse and said seismic waves after travel through the earth, demodulating means responsive to the frequency modulated carrier for actuating said recorder to record said impulse and said signal, said demodulating means including signal-limiting means for preventing operation of said recording means by amplitude modulation of said carrier, means operable immediately after said geophone signal produces said frequency modulation for so biasing said amplifiers as to prevent further frequency and amplitude modulation of said carrier during the period of recording of said seismic waves, and manually operable means for rendering said biasing means ineffective thereby to render effective said frequency and amplitude modulating means for subsequent modulation of said carrier.

4. In a system for geophysical exploration in which seismic waves are created below the earth's surface and their travel time through the earth measured, the combination of a single radio transmitter for radiating a carrier from a sending location, means for producing a single electrical impulse co-incidentally with the instant of creation of said seismic waves, means including an amplifier operable by said single impulse for frequency modulating said carrier substantially during the period of said impulse, a second amplifier, sound responsive means including said second amplifier and concurrently operable with said frequency modulating means for producing amplitude modulation of said carrier, means including a seismic recorder at a receiving location for recording on a single trace said impulse and seismic waves after travel through the earth, an amplifier and gain control means for producing variable gain of said amplifier during the period of recording of seismic waves, demodulating means responsive to the frequency modulated carrier for applying to said amplifier and recorder a signal representative of said impulse, means operable by said signal for initiating operation of said control means, said demodulating means including signal-limiting means for preventing operation of said recording means by amplitude modulation of said carrier, means operable immediately after said geophone signal produces said frequency modulation for so biasing said first-named amplifier as to prevent further frequency modulation of said carrier during the period of recording of said seismic waves, and means for rendering said biasing means ineffective thereby to render effective said frequency modulating means for subsequent modulation of said carrier.

5. In a system for geophysical exploration in which seismic signals produced at a shotpoint are recorded at a receiving location, the combination of a transmitter for generating and radiating a single electromagnetic carrier, a first amplifier including an amplifying tube operable upon creation of said seismic signals for frequency-modulating said carrier, a second amplifier having an amplifying tube operable by voice signals for amplitude-modulating said carrier, a gas tube normally biased to a non-conducting condition, a single source of supply for the anodes of said amplifying tubes and said gas tube, circuit connections for operating said amplifying tubes with their cathodes substantially at the same potential as the anode of said gas tube, a resistor, means connecting said resistor in series-circuit relation with said gas tube and for connecting it in the grid circuits of said amplifying tubes for the development, upon current flow through said resistor, of a negative bias to prevent conduction of current by said amplifier tubes, and means operable within a short time interval after creation of said seismic waves for rendering said gas tube conductive thereby to produce said negative bias.

EARLEY M. SHOOK.
ROBERT W. OLSON.